United States Patent
Gonzalez Leon et al.

(10) Patent No.: US 8,853,306 B2
(45) Date of Patent: Oct. 7, 2014

(54) SUPRAMOLECULAR POLYMER-CONTAINING BITUMINOUS COMPOSITION

(75) Inventors: Juan Antonio Gonzalez Leon, Lyons (FR); Gilles Barreto, Messimy (FR)

(73) Assignee: Ceca S.A., La Garenne Colombes (FR)

( * ) Notice: Subject to any disclaimer, the term of this patent is extended or adjusted under 35 U.S.C. 154(b) by 178 days.

(21) Appl. No.: 13/390,824

(22) PCT Filed: Aug. 18, 2010

(86) PCT No.: PCT/EP2010/062017
§ 371 (c)(1),
(2), (4) Date: May 7, 2012

(87) PCT Pub. No.: WO2011/020847
PCT Pub. Date: Feb. 24, 2011

(65) Prior Publication Data
US 2012/0220701 A1   Aug. 30, 2012

Related U.S. Application Data

(60) Provisional application No. 61/234,678, filed on Aug. 18, 2009.

(30) Foreign Application Priority Data

Aug. 18, 2009 (FR) ..................... 09 55696

(51) Int. Cl.
- C08L 95/00 (2006.01)
- C09D 195/00 (2006.01)
- C08F 26/00 (2006.01)
- C08F 26/06 (2006.01)
- C08L 33/14 (2006.01)
- C08F 218/08 (2006.01)

(52) U.S. Cl.
CPC ............. C08L 95/00 (2013.01); C08L 95/005 (2013.01); C08F 218/08 (2013.01); C08L 33/14 (2013.01)
USPC .............. 524/59; 524/68; 524/69; 525/98; 526/258; 526/259; 526/317.1; 526/319; 526/348

(58) Field of Classification Search
USPC ............ 524/68, 59, 69; 525/88, 98; 526/258, 526/259, 317.1, 319, 348
See application file for complete search history.

(56) References Cited

U.S. PATENT DOCUMENTS

| | | | |
|---|---|---|---|
| 2,727,016 A | 12/1955 | Hankins | |
| 5,336,705 A * | 8/1994 | Gorbaty et al. | 524/68 |
| 5,618,862 A | 4/1997 | Germanaud | |
| 5,910,212 A | 6/1999 | Hendriks | |
| 6,451,885 B1 * | 9/2002 | Dresin et al. | 524/60 |
| 6,588,974 B2 | 7/2003 | Hildebrand | |
| 2001/0033826 A1 * | 10/2001 | Roulier et al. | 424/43 |
| 2005/0076810 A1 | 4/2005 | Barthel | |
| 2006/0039939 A1 * | 2/2006 | Lai et al. | 424/401 |
| 2006/0236614 A1 | 10/2006 | Antoine | |
| 2008/0194772 A1 * | 8/2008 | Kong et al. | 525/426 |
| 2008/0259714 A1 | 10/2008 | Brock | |
| 2010/0264249 A1 * | 10/2010 | Sawicki | 242/588.3 |
| 2011/0144242 A1 * | 6/2011 | Chaverot et al. | 524/59 |

FOREIGN PATENT DOCUMENTS

| | | |
|---|---|---|
| EP | 0466357 A1 | 1/1992 |
| EP | 0528581 A1 | 2/1993 |
| EP | 0829475 A1 | 3/1998 |
| EP | 1469038 A1 | 10/2004 |
| FR | 2853647 A1 | 10/2004 |
| FR | 2924121 A1 | 5/2009 |
| JP | 2005179456 A | 7/2005 |
| JP | 2008266417 A | 11/2008 |
| WO | WO-9720890 A2 | 6/1997 |
| WO | WO-0107396 A1 | 2/2001 |
| WO | WO-03059964 A2 | 7/2003 |
| WO | WO-2006082234 A1 | 8/2006 |
| WO | WO-2006087475 A1 | 8/2006 |
| WO | WO-2006106138 A1 | 10/2006 |
| WO | WO-2006106222 A1 | 10/2006 |
| WO | WO-2006122922 A1 | 11/2006 |
| WO | WO-2006131479 A1 | 12/2006 |
| WO | WO-2007073378 A1 | 6/2007 |
| WO | WO-2007112335 A2 | 10/2007 |
| WO | WO-2007141458 A2 | 12/2007 |
| WO | WO-2008148974 A2 | 12/2008 |

OTHER PUBLICATIONS

International Application Serial No. PCT/EP2010/062017, International Search Report mailed Nov. 15, 2010, 3 pgs.

* cited by examiner

*Primary Examiner* — Jeffrey Mullis
(74) *Attorney, Agent, or Firm* — RatnerPrestia

(57) ABSTRACT

The invention relates to a bituminous composition containing at least one bitumen and at least one polyolefin capable of forming a supramolecular assembly comprising one or more associative group(s). The invention also relates to the use of such bituminous composition for the preparation of asphalt mixtures useful for the coating of rolling surfaces, for the preparation of water-proofing coatings, and for the preparation of adhesive formulations.

18 Claims, No Drawings

SUPRAMOLECULAR POLYMER-CONTAINING BITUMINOUS COMPOSITION

CROSS REFERENCE TO RELATED APPLICATIONS

This is a U.S. National Phase application of application number PCT/EP2010/062017, filed Aug. 18, 2010 (the disclosure of which is incorporated herein by reference in its entirety for all purposes), which claims priority benefit of French Application number 0955696, filed Aug. 18, 2009, and U.S. application 61/234,678 filed on Aug. 18, 2009.

BACKGROUND OF THE INVENTION

Field of Invention

This invention relates to bituminous compositions comprising specific polymer materials used particularly for the preparation of asphalt mixtures with enhanced mechanical properties. In particular, the present invention relates to compositions of bitumen with polymers capable of forming a supramolecular assembly that confers enhanced mechanical properties to the mixture and their applications. Examples of such applications are in water-proof coatings, adhesives, roofing, in the fabrication of asphalts mixtures with mineral aggregates for the construction, or maintenance of sidewalks, roads, highways, parking lots or airport runaways and service roads and any other rolling surfaces.

Bitumen or asphalt is the heaviest portion from the oil distillation process. Due to the different origins and distillation processes of such oils, the resulting bitumen may have a wide range of properties and characteristics. In the present invention, bitumen refers not only to the product from oil by direct distillation or from distillation of oil at reduced pressures, but as well the product coming from the extraction of tar and bituminous sands, the product of oxidation and/or fluxation with carbonated solvents including paraffins and waxes of such bituminous materials, as well as blown or semi-blown bitumens, synthetic bitumens (such as described in FR 2 853 647 A1), tars, oil resins or indene-coumarone resins mixed with aromatic and/or paraffinic hydrocarbons, the mixtures of such and the mixtures of such bituminous materials with acids and the like.

The main application for bitumen is in asphalt mixtures where the bitumen is mixed with mineral aggregates that can be of different size, shape and chemical nature. These asphalt mixtures are particularly used for construction or maintenance of sidewalks, roads, highways, parking lots or airport runaways and service roads and any other rolling surfaces. In the present invention, mineral aggregates are the product from quarries as well as aggregates recuperated from previous asphalt mixtures (as described in the AFNOR XP P98-135, December 2001 and in the Asphalt Handbook MS-4 7$^{th}$ edition, published by the Asphalt Institute), products from building demolition and their mixtures. Other common components in asphalt mixtures are organic and inorganic fibres, such as glass, metal or carbon fibres, as well as, cellulose, cotton, polypropylene, polyester, vinyl and polyamide fibres.

It is known by any person skilled in the art, that polymers can be added to the bitumen in order to produce asphalt mixtures with enhanced mechanical properties. Polymers are large molecules formed by the chemical linkage of several repeating units or monomers. Modification of bitumen with polymers of high molecular weights (above ~10,000 g/mol) is generally required to improve the mechanical behaviour of an asphalt mixture.

Although there exist solutions to harden bitumen, for example by incorporating paraffins or polyphosphoric acid, aiming at increasing the stiffness of the bitumen at high service temperature to avoid rutting, these solutions are only partial because the high thermal susceptibility of the modified bitumen remains (unlike as in polymer modified bitumens, where it is improved at high and low temperatures) creating or even enhancing problems at low temperature like for example a lack of flexibility.

Hence polymer modification of bitumen is very often used to increase its low temperature flexibility, that is below the ambient temperature and down to about −40° C., and the same polymer modification increases the softening point of the bitumen. It can also increase the cohesion and stiffness of the bitumen at high service temperature and consequently that of the asphalt mixture made with it, improving its resistance to rutting. Examples of polymers commonly used in the modification of bitumen are: styrene butadiene rubbers, styrene/butadiene block copolymers, ethylene vinyl acetate copolymers, ethylene acrylate copolymers, polyethylene and other polyolefins (see "Asphalt binder testing manual", Asphalt Institute 2007). The use of non-crosslinked low molecular weight polymers, also known as oligomers, or other small molecules cannot modify the bitumen in the manner as polymers do.

Incorporating polymers into the bitumen, even at the low contents commonly used (from 2% to 6% of polymer) is not an easy task. Polymers and bitumen have at most only a partial compatibility that usually makes the polymer to phase separate from the bitumen overtime. In addition, due to the high viscosities of molten polymers, the mixing process requires high temperatures and long mixing times under vigorous agitation to achieve a good dispersion of the polymer in the bitumen. The required temperatures to achieve the dispersion of polymer into bitumen are generally higher than the usual storage and fabrication temperatures according to the pure, neat bitumen's nature.

For example, U.S. Pat. No. 5,618,862 shows as an example that the dispersion of a styrene butadiene copolymer with a molecular weight of 100,000 Daltons at 3.5% in bitumen with a penetration of 80/100 takes 2.5 hours at 175° C. to be homogeneous. For this kind of bitumen, a typical storage temperature of the neat bitumen is between 140° C. and 160° C.

The use of a modified bitumen in order to fabricate an asphalt mixture generally results in a change of the fabrication process relatively to the unmodified bitumen. In the case of emulsions, for example, the addition of polymer may limit the grade of bitumen used since the emulsification process with water limits the temperature at which the bitumen can be added to avoid bitumen emulsion boiling which is detrimental to the emulsion stability. More viscous bitumen grades at higher temperatures may be used to fabricate emulsions in water at higher than atmospheric pressures to avoid water boiling. However, this adds a certain complexity to the emulsion fabrication process. In the case of hot mix asphalt fabrication, higher temperatures for fabrication, laying and compaction are required when modified bitumen is used. The higher viscosity of polymer-modified bitumen, compared to the one of the pure bitumen, can also bring problems to processing methods at temperatures below 100° C. and higher than room temperature, reducing the overall asphalt mixture fluidity.

The addition of a crosslinking agent, such as a sulphur-containing compound, is also commonly used in polymer-modified bitumens to further increase its performance. Such network reduces phase separation between the bitumen and the polymer component. Nevertheless, the formed network also increases the viscosity of the bitumen composition even further, requiring an even higher process temperature. In addition, the handling of such sulphur-containing compounds combined with the high temperatures required to achieve the mixing add complexity to the task and present important safety issues during the modified bitumen fabrication process.

It could be of practical interest to improve the performance of a polymer-modified bitumen without the need of such crosslinking agents, a modification to the polymer mixing process and any substantial increase in its fabrication time and or temperature. By keeping dispersion temperature, and/or time to a minimum, the amount of bitumen oxidation and aging would be reduced, extending the life of the final application, such as in an asphalt mix for a road. This would also translates into a reduction on the amount of energy consumed during dispersion and, most importantly, during an asphalt mixture fabrication process. Decreasing the aggregates and bitumen temperatures during the asphalt mixture fabrication process would also significantly reduce the amount of polluting emissions, including $CO_2$ and other greenhouse effect gases.

Since the main problem with the formation of chemical networks of regular or conventional polymers into bitumen is their high viscosity, one solution would be to have a polymer or polymer network with good mechanical properties at asphalt mixture application temperatures (about −20° C. to 70° C.) while having low viscosity at elevated temperatures (above 100° C.). Such low viscosity at higher temperatures would make the dispersion of such polymer or polymer network into the bitumen considerably easier under lower temperatures, milder mixing conditions and shorter mixing times. This would also result in an easier use of the modified bitumen thanks to the lower temperatures and or lower process duration.

Polymer materials with such properties can be achieved by the use of small or medium-sized molecules behaving as monomers (or oligomers) that are possibly forming supramolecular polymer-like structures, which also may form networks as in chemical crosslinked polymers, with non-covalent bonds at low temperatures, which dissociate at high temperatures.

WO 01/07396 describes a polymer-like material prepared from oligomers that can associate into large structures by means of hydrogen bonding between specific carboxylic acid and alcohol functional groups. The resulting material shows mechanical properties far superior to those of the original monomer, which increase with the number of associated functional oligomers. No application with bitumen is discussed in this text.

WO 03/059964 describes another supramolecular polymer based on a different chemistry. In this case, polymer-like properties are also achieved by the interconnection of the smaller molecules by hydrogen bonding. No application with bitumen is discussed in this text.

WO 2006/087475 describes an elastomer material formed by the supramolecular assembly of smaller molecules. The rubber-like material of this invention becomes a liquid above a certain temperature due to the dissociation of the hydrogen bonds. The transition from elastic polymer to liquid is reversible with temperature. No application with bitumen is discussed in this text.

FR 2 924 121 describes the use of organogelling molecules in bitumen compositions that improve the bitumen mechanical properties by forming thermoreversible networks with reduced viscosities at application temperatures. However, the process for the addition of the organogelling molecules uses quite a high temperature (170° C. for an initial 50 penetration grade neat bitumen) and a relatively long mixing time of 2 hours.

SUMMARY OF THE INVENTION

According to a first aspect, it is the matter of this invention a bituminous composition, said bituminous composition preferably being in the form of a dispersion or a solution, with improved mechanical properties to those achieved with conventional polymer-modified bitumens at final application conditions, comprising at least one bitumen and at least one polyolefin.

More specifically, the bituminous composition of the present invention comprises at least one polyolefin polymer capable of forming a supramolecular assembly. This means that the above said polyolefin, as an isolated object, comprises at least one associative group that may form inter- and/or intra-molecular physical bonds building a physical network, resulting in a polymer with low viscosity at high temperatures (at which the network tends to dissociate) and high modulus at low temperatures (at which the network is mostly associated).

By "associative group" is meant any group capable of forming associative bonds that are non-permanent (i.e. reversible) physical interactions, such as ionic bonds, hydrogen bonds, ion-dipole interactions, dipole-dipole interactions, and the like.

The presence of such associative groups in the herein described polymers makes it possible the building of supramolecular assembly, as defined above. In the present invention, "associative bonds" preferably means hydrogen bonds, and more preferably hydrogen bonds between nitrogen-containing group(s).

Surprisingly, the bituminous composition of the invention shows enhanced mechanical properties compared to that of the bitumen and of a bituminous composition containing the same polyolefin without the before mentioned associative groups. Such enhanced properties translate to its final application, among which water-proofing of surfaces, adhesives, and the coating of rolling surfaces, such as asphalt mixtures for roads, parking lots or airport runaways, tack coats, cheap seal, surface dressing, surface impregnation, roof- or terrace-coatings, or roofing membranes, wall and floor coatings, and waterproofing in general, as well as bituminous adhesive compositions.

The present invention has the advantage that the process of adding the polyolefin to the bitumen is done in a simple manner at similar temperatures at which the pure bitumen is stored. The incorporation of such polyolefin into the bitumen is considerably simpler than in conventional polymer-modified bitumen, especially those that are chemically crosslinked, due to its low viscosity at high temperatures. Substantially lower temperature, shorter mixing times under mild to low shear conditions are required for its dispersion in bitumen since the present invention does not require any other chemical compound, such as catalyst or crosslinking agents to achieve the enhancement of the mechanical properties at application conditions.

DETAILED DESCRIPTION OF THE INVENTION

The bituminous composition of the present invention preferably is in the form of a dispersion or a solution, and comprises at least one bitumen and at least one polyolefin comprising one or more associative groups capable of forming a supramolecular assembly.

By bitumen is meant a bituminous material obtained from the distillation of oil under atmospheric or reduced pressure, the product resulting from the extraction of tar and bituminous sands, the product of oxidation and/or fluxation with carbonated solvents including paraffins and waxes of such bituminous materials, as well as blown or semi-blown bitumens, synthetic bitumens (such as described in FR 2 853 647), tars, oil resins or indene-coumarone resins mixed with aromatic and/or paraffinic hydrocarbons, the mixtures of such and the mixtures of such bituminous materials with acids and the like.

In the present invention, the at least one polyolefin comprising one or more associative groups capable of forming a supramolecular assembly may be any kind of polymer obtained by polymerisation of olefinic monomers, i.e. monomers containing at least one polymerizable double bond, one or more such monomers additionally comprising at least one associative group(s), i.e. group(s) capable of forming a supramolecular assembly.

In the present invention, "polyolefin" means a copolymer comprising at least two different monomer moieties. Olefinic copolymers of the present invention may thus comprise two, three, four or more different monomer moieties, preferably two or three, more preferably two different monomers moieties.

Non-limiting examples of olefinic monomers include monomers comprising at least one polymerizable reactive ethylenic group, such as ethylene, propylene, butylenes, butadienes, vinylic monomers, such as styrene, vinyl esters (e.g. acetate, butyrate, and the like), (meth)acrylic acid, alkyl (meth)acrylates (where alkyl stands for linear or branched $C_1$-$C_6$, preferably $C_1$-$C_4$, saturated hydrocarbon chain), (meth)acrylamide, and the like.

Olefinic monomers additionally comprising at least one, preferably one, associative group(s), are typically chosen from among monomers comprising i) at least one polymerizable reactive ethylenic group, as described above and preferably chosen from among vinyl, allyl, styryl, (meth)acrylic, alkyl(meth)acrylate (where alkyl stands for linear or branched $C_1$-$C_6$, preferably $C_1$-$C_4$, saturated hydrocarbon chain), (meth)acrylamide; and ii) at least one associative group.

The polymerizable double bond is preferably a double bond from an alkyl(meth)acrylate, as defined above, or (meth)acrylamide moiety, but also from vinyl functions or groups.

In the olefinic monomers additionally comprising at least one associative group(s), the at least one polymerizable double bond on the one hand and the said at least one associative group(s) on the other hand are covalently linked together by a covalent bond or an alkylene chain comprising from 1 to 30 carbon atoms, some of them optionally being substituted, said alkylene chain optionally comprising one or more heteroatom(s) preferably chosen from among sulphur, oxygen and nitrogen, and/or optionally comprising ester and/ or amide functional group(s).

Typically, the above described alkylene chain is a $C_1$-$C_{24}$, preferably $C_1$-$C_{10}$, linear or branched alkylene chain, optionally comprising one or more nitrogen atom(s). More preferably the alkylene chain is a $C_1$-$C_6$ linear alkylene chain.

According to a preferred aspect of the present invention, the associative group comprises at least one 5- or 6-membered heterocyclic ring containing at least one, and preferably two nitrogen atoms, preferably together with at least one carbonyl or thiocarbonyl function.

Examples of such associative groups, according to this preferred embodiment of the present invention, include, in a non-limiting way, imidazolinyl, triazolyl, bis-ureyl, ureidopyrimidyl, imidazolinyl being particularly preferred.

The olefinic monomer comprising at least one, and preferably one, associative group(s) may therefore be of the following formula (1):

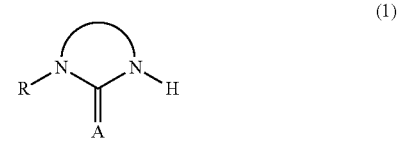

wherein:
R represents a group of formula T-(G)$_n$-, T being a reactive polymerizable group with at least one ethylenic function, preferably chosen from among N-substituted or N,N-disubstituted (meth)acrylate or (meth)acrylamide function, and vinyl, allyl or styryl function;
n is 0 or 1;
G is a $C_1$-$C_{24}$, preferably $C_1$-$C_{10}$, linear or branched alkylene chain, optionally comprising one or more nitrogen atom(s), preferably a $C_1$-$C_6$ linear alkylene chain; and
A represents oxygen or sulphur, preferably oxygen.

Preferred examples of olefinic monomers comprising associative group(s) are ethylimidazolidone methacrylate, as described in EP-0 829 475, and ethylimidazolidone methacrylamide, as described in U.S. Pat. No. 2,727,016.

The polyolefins for use in the present invention are preferably prepared from ethylene and at least one associative group-containing olefinic monomer as described above. The polyolefins for use in the present invention may alternatively be prepared from ethylene, at least one associative group-containing olefinic monomer as described above, and one or more other olefinic monomer(s). Non-limiting examples of such other olefinic monomer(s) include:

unsaturated carboxylic acids, such as acrylic acid or methacrylic acid, the amount of which generally being less than 50 wt % of the total mass of the polymer, preferably between 5 wt % and 40 wt % of the total mass of the polymer;

unsaturated carboxylic acid esters, such as alkyl acrylates or alkyl methacrylates, the alkyl chains of these esters being linear or branched and comprise up to 30 carbon atoms, for example 1 to 10 carbon atoms, and preferably 1 to 4 carbon atoms, among which alkyl chains mention may be made of methyl, ethyl, propyl, n-butyl, sec-butyl, iso-butyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, henicosyl, docosyl, triacosyl, tetracosyl, pentacosyl, hexacosyl, heptacosyl, octacosyl, nonacosyl; preferred unsaturated carboxylic acid esters are methyl, ethyl, n-butyl and 2-ethylhexyl(meth)acrylates, more preferably methyl, ethyl and n-butyl; the amount of unsaturated carboxylic acid ester is generally less than 50 wt % of the total mass of the polymer, preferably between 5 wt % and 40 wt % of the total mass of the polymer;

carboxylic acid vinyl esters preferably comprising from 4 to 40 carbon atoms, more preferably from 4 to 10 carbon atoms, examples of which include vinyl acetate, vinyl versatate, vinyl propionate, vinyl butyrate and vinyl maleate, vinyl acetate being most preferred; the amount of carboxylic acid vinyl ester is generally less than 50 wt % of the total mass of the polymer, preferably between 5 wt % and 40 wt % of the total mass of the polymer;

olefins, advantageously alpha-olefins (different form ethylene) preferably comprising from 3 to 50 carbon atoms, more preferably from 4 to 20 carbon atoms, most preferably from 6 to 10 carbon atoms, examples of which include styrene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene, and 1-triacontene; the amount of olefin is generally less than 10 wt % of the total mass of the polymer, preferably between 0.1 wt % and 5 wt % of the total mass of the polymer;

dienes, preferably comprising from 3 to 50 carbon atoms, more preferably from 3 to 20 carbon atoms, examples of which include butadiene and ethylidene-norbornene; the amount of diene is generally less than 10 wt % of the total mass of the polymer, preferably between 0.1 wt % and 5 wt % of the total mass of the polymer;

unsaturated carboxylic acid anhydrides preferably comprising from 4 to 30 carbon atoms, examples of which include maleic anhydride, itaconic anhydride, citraconic anhydride, and tetrahydrophthalic anhydride, maleic anhydride being preferred; the amount of unsaturated carboxylic acid anhydride is generally less than 10 wt % of the total mass of the polymer, preferably between 0.1 wt % and 5 wt % of the total mass of the polymer;

unsaturated epoxides preferably comprising from 4 to 30 carbon atoms, examples of which include aliphatic glycidyl esters or ethers, such as allylglycidylether, vinylglycidylether, glycidyl maleate or itaconate, glycidyl acrylate or methacrylate, glycidyl methacrylate being preferred; other examples include alicyclic glycidyl esters or ethers, such as 2-cyclohexene-1-glycidylether, cyclohexene-4,5-diglycidylcarboxylate, cyclohexene-4-glycidylcarboxylate, 5-norbornene-2-methyl-2-glycidylcarboxylate and endo-cis-bicyclo[2,2,1]-5-heptene-2,3-diglycidyldicarboxylate; the amount of unsaturated epoxide is generally less than 10 wt % of the total mass of the polymer, preferably between 0.1 wt % and 5 wt % of the total mass of the polymer.

According to a preferred aspect, the polymers for use in the present invention are prepared from the following monomers:
ethylene;
olefinic monomer(s) comprising at least one associative group, preferably ethylimidazolidone methacrylate or ethylimidazolidone methacrylamide; and
at least one other monomer chosen from among styrene, vinyl acetate, methyl, ethyl, n-butyl and 2-ethylhexyl (meth)acrylate.

According to a still preferred aspect, the polymer for use in the present invention, is a polymer prepared from the polymerisation of the following monomers, the amount of which, relative to the total mass of the polymer being:
from 5 wt % to 99.98 wt %, preferably from 55 wt % to 89.9 wt %, of ethylene;
from 0.01 wt % to 20 wt %, preferably from 0.1 wt % to 10 wt %, of at least one associative group-containing olefinic monomer; and
from 0.01 wt % to 50 wt %, preferably from 10 wt % to 40 wt % of at least one other monomer, preferably chosen from among styrene, unsaturated carboxylic acids, carboxylic acid vinyl esters, and mixtures thereof.

The amounts of the various monomers present in the polyolefins for use in the present invention may be assessed by infrared spectroscopy, according to ISO 8985 (1998).

In order to obtain the associative group-containing polyolefins for use in the present invention, the said associative group containing-monomers are introduced during the polymerization process, in admixture with ethylene and the optional other monomers. As a result, the associative group-containing monomers are inserted within the very backbone of the polyolefin chain.

The polyolefins for use in the present invention may thus be prepared according to the hereinafter detailed polymerization process, under pressure. This polymerization process preferably is a high-pressure radical polymerization process. The reaction may be for example conducted in an agitated or tubular autoclave.

The pressure inside the reactor (autoclave) generally ranges from 1000 bars to 3000 bars, preferably from 1500 bars to 2500 bars. The initial reaction temperature generally ranges from 100° C. to 300° C., advantageously from 100° C. to 170° C. The maximum reaction temperature is typically comprised between 180° C. and 300° C., preferably between 180° C. and 260° C.

The polymerization reaction is generally carried out by introducing ethylene, the associative group-containing monomer(s), optionally the other monomer(s), and a polymerization initiator, under pressure, into an tubular reactor or an autoclave, at a temperature of between 100° C. and 150° C., the amount of associative group-containing monomer(s) preferably being up to 20 wt % relative to the total amount of monomers (ethylene and other comonomers) involved in the polymerization reaction.

When the reactor is a tubular reactor, the mixture of ethylene/other monomer(s)/initiator is preferably introduced at the entry point of the reactor, and, optionally, at least one other injection point along the tubular reactor. This technique is called multipoint injection, and is well known in the art.

Together with the olefinic monomers and the initiator, a transfer agent may also be added, generally in an amount of less than 1 mol %. Transfer agents that may be used allow the control of the molar mass, and examples of which are aliphatic aldehydes or ketones, e.g. propanaldehyde or methyl ethyl ketone (MEK). The amount of initiator preferably ranges from 10 ppm to 1000 ppm (by weight) relative to the total weight amount of introduced monomers.

Examples of polymerisation initiators include, in a non-limiting way, all organic compounds able to generate free radicals under the reaction conditions. Preferably used are compounds comprising peroxide group(s), and more preferably mixtures thereof. Among the compounds comprising peroxide group(s), mention may for example be made of peroxyesters, diacyls, percarbonates, peroxyketals, dialkyls and hydroperoxydes.

Particularly suitable peroxides are, for example, tert-butylperoxy-neodecanoate, tert-butylperoxy-2-ethyl hexanoate, tert-butylperoxy-3,5,5-trimethylhexanoate, tert-butylperoxypivalate, di-tert-butylperoxide, as well as mixtures thereof.

The polymerization process for preparing the polyolefins for use in the present invention thus is a radical copolymerization process, carried out under high pressure, wherein ethylene, at least one associative group-containing monomer, optionally one or more other monomer(s), a polymerization initiator and optionally a transfer agent are introduced into a tubular reactor, or an autoclave, at a pressure of between 1000 bars and 3000 bars, at a temperature ranging from 80° C. to 325° C., the amount of associative group-containing monomers being up to 20 wt % relative to the total mass of olefinic monomers.

According to the above-described polymerisation process, the number of associative groups present in the obtained polyolefin may be finely adjusted by varying the amount of associative group-containing monomer and/or by varying the reaction time and/or temperature and/or pressure. Generally the amount of associative group-containing monomer represents from 0.1 wt % to 20 wt %, preferably from 0.1 wt % to 15 wt %, more preferably from 0.1 wt % to 10 wt % relative to the total mass of the polyolefin and/or the average number of associative groups in each polymer chain is comprised between 1 and 200, preferably between 1 and 100, still more preferably between 1 and 50, most preferably between 1 and 30.

Moreover, the polyolefins for use in the present invention have melt index (as measured by the ASTM D1238) comprised between 1 g/10 min and 1000 g/10 min, preferably between 3 g/10 min and 800 g/10 min, more preferably between 5 g/10 min and 500 g/10 min.

Moreover, it is well in the scope of the invention to chemically cross-link the associative group-containing polyolefins by the use of a cross-linking agent before, or more preferably after the bituminous composition is prepared. Examples of such cross-linking agents may be urea, sulphur or sulphur-containing molecules such as di-tert-dodecylpentasulphide.

The content of the at least one polyolefin in the present invention is preferably in the range of 0.05 parts by weight to 20 parts by weight for 100 parts by weight of bitumen(s). Less than 0.05 parts by weight of the polyolefin would not lead to the expected effects. A polyolefin amount of higher than 20 parts by weight would be compatible with the aim of the present invention, this upper limit of 20 parts by weight being set for economic purposes only. The expected effects would also be achieved with amounts of more than 20 parts by weight, and even more than 30 parts or 40 parts by weight.

The bituminous composition of the present invention may be in the form of an aqueous emulsion, the amount of water generally ranging from 5 vol % to 90 vol %, preferably from 10 vol % to 80 vol % of the total volume of the emulsion.

It has been found that the above-described associative group-containing polyolefins improve the physico-chemical characteristics of bitumen as compared with bituminous compositions modified with polyolefins that do not comprise any associative group.

The above-described polyolefins surprisingly show low viscosity in the range of temperatures at which bitumen compositions are generally prepared and at the same time present good mechanical properties at application temperatures (road application for example).

Without being bound to theory, an explanation of these properties could be the result of the formation of thermoreversible associations or bonds between the polyolefins, principally by the associative groups present in the polyolefin. These associations are of the hydrogen bond type. The number of associations can be more than two per molecule, resulting in the formation of a network that can further improve the mechanical properties of the polyolefin at lower temperatures.

The bituminous composition of the present invention offers a unique advantage over regular chemical crosslinked polymer-modified bitumens in their preparation process. Normally, chemical crosslinking requires the handling of crosslinking agents, which addition is not always carried out at the same time than the polymer, long mixing times (usually hours), as well as specific mixing devices with high shear conditions. Due to the higher viscosities achieved with chemical crosslinking, it is required to heat the bituminous composition to temperatures higher than their normal storage temperatures (by about 20° C.). In contrast, the preparation process for the present invention can be carried out at temperatures much closer to those at which the pure bitumen is regularly stored and in significantly shorter times (minutes) under mild to low shear conditions, even when cross-linking agent(s) is(are) used.

According to another embodiment, the bitumen composition of the present invention may further includes at least one non-ionic, anionic, cationic, zwitterionic or amphoteric surfactant added into the bitumen or into the water phase.

The bituminous composition of the present invention may also comprise one or several other components, such as those commonly used in the field of bitumen and asphalts. These may include anti-stripping agents, generally anionic, cationic, zwitterionic or amphoteric surfactants. Non-limiting examples of such anti-stripping agents are: alkylcarboxylic acids, sulphated surfactants, sulphonated surfactants, alkyl or aryl carboxylic acids, fatty acid esters of quaternary alkanol amines, alkyl amido polyamines, alkyl imidazolines and alkyl imidazo polyamines, the products from the reaction between polyamines and fatty carboxylic acids, the products from the reaction between alkyl polyamines and fatty carboxylic acids, and in a similar manner, the products from the reaction between fatty acids or vegetal oil and diethanolamine, followed by the reaction with polyamines. Non-limiting examples of quaternary alkanol amines are betain salts and N,N,N-trialkyl choline salts with strong organic or inorganic acids, such as for example (methane)sulphonic acid.

The polyamines are, as non-limiting examples, dimethyl amino propylamine, N-amino ethyl piperazine, diethylene triamine, triethylene tetramine and tetraethylene pentamine.

Other additives that may be advantageously added to the bituminous composition described in this invention are chosen from among:

polyphosphoric acid, comprising all different existing grades and designations of polyphosphoric acids including pyrophosphoric acid, triphosphoric and metaphosphoric acids with phosphonic acid, pyrophosphates, and other similar compounds comprising at least one (OH—)P=O group, such as those described in WO 2008/148974, polymers, generally used in order to improve the mechanical performance of the bitumen and the asphalt mixture, paraffins, for example Fischer-Tropsch paraffins described in U.S. Pat. No. 6,588,974, fluxants, organic or inorganic acids, esters of fatty acids and functionalised waxes, dialkyldiamides as for example those cited in WO 2007/73378, resin components, such as rosin acids, or modified rosin acids, tall oil pitch, pine tar pitch, pine rosins, tall oil rosins, asphaltites, e.g. Gilsonite®, oils from vegetal or mineral sources and derivatives thereof, as well as mixtures of two or more of the above additional additives.

Other additives that may be advantageously added to the bituminous composition described in this invention are chosen from among those used to reduce the production temperature of an asphalt mixture, such as those described in WO 2006/106222, WO 2007/141458 and WO 2008/148974.

According to a further aspect, the present invention also encompasses the addition of regular polymers generally used in order to improve the mechanical performance of the bitumen and the mixture, i.e. commonly used in the modification of bitumen such as: styrene butadiene rubbers, styrene/butadiene block copolymers, ethylene-vinyl acetate copolymers, ethylene-acrylate copolymers, polyethylene and other polyolefins (as disclosed in "Asphalt binder testing manual", Asphalt Institute 2007) as well as crumb rubbers. Polyamide and polyester polymers are not preferred as regular polymer additives for the bituminous compositions of the present invention.

All these other components and additives can be added to the bituminous compositions by any known means. Generally, the amount of said other components and additives are present in the bituminous composition of the present invention in an overall amount ranging from 0.01% to 30% by weight to the total mass of the bituminous composition.

According to a preferred embodiment, the amount of polyolefins for use in the bituminous compositions of the present invention is greater than or equal to 10% by weight, relative to the weight of all polymer additives present in the bituminous composition, preferably greater than or equal to 20% by weight, more preferably greater than or equal to 30% by weight, even more preferably greater than or equal to 40% by weight, and most preferably greater than 50% by weight. The expression "all polymer additives" means all polymers present in the bituminous composition, i.e. the polyolefins as described above, and all polymer additives, generally used in order to improve the mechanical performance of the bitumen and the asphalt mixture such as regular polymers as defined above.

According to still another preferred embodiment of the present invention, when polyamide polymers (i.e. polymers wherein the repeating units are linked by amide groups) are present as polymer additives in the bituminous compositions of the invention, the amount of said polyamide polymers is less than 50% by weight, preferably less than 40%, more preferably less than 30%, still more preferably less than 20%, and most preferably less than 10%, and even less than 5% by weight, relative to the total weight of polyolefin polymers and polyamide polymers. When polyester polymers (i.e. polymers wherein the repeating units are linked by ester groups) are present as polymer additives in the bituminous compositions of the invention, the amount of said polyester polymers is less than 50% by weight, preferably less than 40%, more preferably less than 30%, still more preferably less than 20%, and most preferably less than 10%, and even less than 5% by weight, relative to the total weight of polyolefin polymers and polyester polymers. As mentioned above, polyamide and polyester polymers are not preferred in the bituminous compositions of the present invention, i.e. the bituminous compositions of the present invention do not contain any polyamide and/or polyester polymer.

In another aspect, the present invention relates to the process for the preparation of a bituminous composition comprising at least polyolefin comprising at least one associative group comprising at least the steps of:
  adding 0.05 to 20 parts by weight of the associative group-containing polyolefin defined above either in a solid, molten, dissolved or dispersed state to 100 parts by weight of a bitumen at its standard temperature for bitumen storage, depending on its class, as described in NF EN 13108-1 of February 2007,
  optionally adding, before or after the addition of the polyolefin, one or more additives such as those described herein before,
  mixing, preferably under mild agitation, by any mechanical means for a period of time generally ranging from 1 minute to several hours, typically from 1 minute to 60 minutes, and
  obtaining a bituminous composition ready to use.

The bituminous composition obtained according to the above process may be produced at any stage of the logistic chain starting at the refinery and ending in the mixer of the mixing plant, and used as such or mixed with mineral aggregates to yield asphalts mixtures.

According to another embodiment, the polyolefin, in a molten or dissolved state, may be added to a continuous flow of the bitumen by any known means, like for example using a direct injection or a direct injection and a static mixer.

In another aspect, the here-above process is carried out to yield an aqueous emulsion of bitumen comprising the polyolefin, the amount of water generally ranging from 5 vol % to 90 vol %, preferably from 10 vol % to 80 vol % of the total volume of the emulsion. In such a case, the bituminous composition is mixed with a water phase containing one or more emulsifier(s), such as those commonly used by the skilled in the art, using a static mixer or a mixer with moving parts or a combination of both of them.

According to another aspect, the present invention relates to a formulation comprising at least one associative group-containing polyolefin as defined above, and at least one or more additives, such as those listed herein before, typically chosen from among anti-stripping agents, organic or inorganic acids, polyphosphoric acid, pyrophosphates, and other similar compounds comprising at least one (OH—)P=O group, the additives described in WO 2008/148974, paraffins, for example Fischer-Tropsch paraffins described in U.S. Pat. No. 6,588,974, esters of fatty acids and functionalised waxes, dialkyldiamides as for example those cited in WO 2007/073378, resin components, such as rosin acids, tall oil pitch, pine tar pitch, pine rosins, tall oil rosins, asphaltites, e.g. Gilsonite®, regular polymers, crumb rubbers, fluxants, asphaltites, oils from vegetal or mineral sources and their derivatives, as well as those used to reduce the production temperature of an asphalt mixture, such as for example those described in WO 2006/106222 and WO 2007/141458.

Depending on the nature of the associative group-containing polyolefins and of the additives, such formulations may not present satisfying storage stability. In such cases the above-defined formulations may advantageously be in the form of a two-pack component, for example the polyolefin(s) on the one-side, and the additive(s) on the second-side or alternatively, the polyolefin(s) with some of the additives on the one-side, and the remainder of the additives on the second side.

The main application for the polyolefins, formulations, and bituminous compositions comprising the same and as presented in this invention is the fabrication of asphalt mixtures for the coating of rolling surfaces, typically for the construction of roads, parking lots, airport runaways or any similar rolling surface. Other applications for the bituminous compositions of the present invention are water-proofing applications, such as for examples water-proofing of roofs, terraces, walls, and the like, as well as applications in adhesive formulations.

The bituminous composition as described in this invention as well as the resulting asphalt mixture fabricated with said bituminous composition surprisingly have enhanced mechanical properties, over the bituminous compositions and asphalt mixtures known in the art.

Therefore, and according to still another aspect, the invention relates to a surface, which is coated in whole or in part with a bituminous composition as previously described and/or an asphalt mixture as defined above, said surface being generally a rolling surface, such as roads, parking lots, bridges, motorways, highways, airport runaways or any similar rolling surface, and also any surface requiring bituminous or asphalt coating, such as pavements, side walks, playgrounds, roofs, terraces, walls and the like.

The mineral aggregates used with the bituminous composition of the present invention to fabricate an asphalt mixture are not limited in chemical nature, shape or size and may be the products from quarries, aggregates recuperated from previous asphalt mixtures (reclaimed asphalt pavement, RAP for example defined in the French Standard AFNOR XP P98-135 from December 2001), products from building demolition and the mixture of any of the above. The asphalt mixture prepared with the bituminous composition presented in this invention may contain other common components of asphalt mixtures such as organic fibres (for example: cellulose, cotton, polypropylene, polyester, polyvinyl alcohol and polyamide fibres) and inorganic fibres (for example: glass, metal or carbon fibres).

In an other embodiment of the invention, the bituminous composition is used for the known techniques of tack coat, cheap seal, in surface dressings, surface impregnation, roof coating or membrane, waterproofing employing anhydrous bituminous composition or as an emulsion.

The bituminous composition described in this invention may be used in any asphalt mixture fabrication methods such as those employing bituminous emulsion addition, hot bitumen addition, or any of the several processes for warm or semi-warm asphalt mixture fabrication (where fabrication temperature is above room temperature but below that in regular hot mixing process), like the bitumen foaming techniques, for example US 2008/00259714 which uses a special foaming device associated with a multistep heating and drying and mixing device, U.S. Pat. No. 5,910,212 and WO 97/20890 which use a hard bituminous binder combined to the mixture of a soft bituminous binder and aggregates, or US 2005/0076810 which uses a high desorption capacity additive, or EP 1 469 038 in which a part of the aggregates is heated and dried and mixed with bitumen and then after mixed with wet aggregates, or US 2006/00236614 in which the aggregates are dried and mixed with bitumen but with the drying step so that a fraction of the initial humidity of the aggregates remains, or WO 07/112335 which uses a water in oil bitumen dispersion with selected surfactants, or U.S. Pat. No. 6,588,974 which uses a Fischer-Tropsch paraffin added into the bitumen, in conjunction or in partial or total replacement of the bitumen mentioned.

The bituminous composition described in the present invention provides advantages over conventional water/bitumen or bitumen/water emulsion fabrication processes with regular chemically crosslinked polymer-modified bitumens. Reduced viscosity at lower temperature allows for the preparation of emulsions with modified bitumen owing to this invention at lower temperatures and pressure. Lower penetration grades of bitumen can be used.

According to another aspect, the present invention relates to the process for the preparation of an asphalt mixture, where the associative group-containing polyolefin in a solid, melted, dissolved or dispersed state is added to the mineral aggregates before, at the same time or after the bitumen or bituminous composition is added into the mixing process.

This applies also to the other components and additives that may be added to the asphalt composition: anti-stripping agents, polyphosphoric acid, paraffins, for example Fischer-Tropsch paraffins described in U.S. Pat. No. 6,588,974, esters of fatty acids and functionalised waxes, dialkyldiamides as for example those cited in WO 2007/073378, resin components, such as rosin acids, tall oil pitch, pine tar pitch, pine rosins, tall oil rosins, Gilsonite®, fluxants, regular polymers, crumb rubbers, oils from vegetal or mineral sources and their derivatives, as well as those used to reduce the production temperature of an asphalt mixture described in WO 2006/106222, WO 2007/141458 and WO 2008/148974.

The above process for the preparation of an asphalt mixture may advantageously be carried out where the bituminous composition of the invention is in the form of an aqueous emulsion.

The present invention also offers several advantages to the fabrication, laying and compaction of asphalt mixtures produced by hot mixing. Fabrication of an asphalt mixture with the invention by hot mixing can be carried out at similar temperatures to those usually used with regular non-chemically crosslinked polymer-modified bitumens. This is not generally possible with chemically crosslinked polymer-modified bitumens since a considerable increase in viscosity takes place when it is cooled from the preparation temperature to the temperature at which the pure bitumen is usually stored (about 20° C. difference). An increase in viscosity leads to a difficult or incomplete coverage of the mineral aggregate by the modified bitumen.

This increase in viscosity would also negatively impact the laying and compaction of the asphalt mixture. In asphalt mixtures fabricated with the bituminous composition presented in this invention, no particular problem related with an increase in viscosity would take place since it remains similar to those of pure bitumen at fabrication, laying and compaction temperatures.

Another advantage of the invention when used to fabricate an asphalt mixture is its ease of recycling compared to those fabricated with regular polymer-modified bitumen, particularly to those that are chemically cross-linked, because once reheated the asphalt mixture comprising the bituminous composition of the present invention has a positively impact one or more of the following properties: better fluidity at the same temperature, handling, flow, mixing, compacting steps, cohesion.

The invention is now illustrated by means of the following examples, which do not intend to bring any limitation to the present invention, the scope of which is defined by the annexed claims.

EXAMPLES

Example 1

Synthesis of a Polymer According to the Invention

Polymers are synthesized by radical polymerisation reaction at high pressure in a 233 cm$^3$ tubular reactor. Ethylene monomer, vinyl acetate monomer (VA), monomers chosen among Norsocryl® 104 (a 50 weight % mixture of imidazolidone methyl methacrylate, named MEIO, and methyl methacrylate), Norsocryl® 105 (a mixture of 40 weight % MEIO, and 60 wt % of 2-ethyl hexyl methacrylate, named AE2H), and methyl methacrylate (named MAM), are introduced into the reactor in the presence of the polymerisation initiator (a 88/32/12 weight % mixture of Luperox® 10/Luperox® 26/Luperox® 270 respectively) and 3000 ppm of transfer agent (propanal). Pressure is set to 2000 bar and initial temperature to 135° C. Norsocryl® and Luperox® products are commercialised by Arkema.

The compositions (weight percent injected of each monomer) and reaction conditions for each of the prepared polymers are shown in Table 1.

TABLE 1

| | VA (wt %) | MEIO (wt %) | MAM (wt %) | AE2H (wt %) | Initiator (ppm) | Pressure (bar) | Polymerisation temperature (max, °C.) | Rate of conversion (%) |
|---|---|---|---|---|---|---|---|---|
| Polyolefin A | 28 | | | | 130 | 2000 | 235 | 12.91 |
| Polyolefin B | 27.6 | | 0.48 | | 130 | 2000 | 210 | 12.8 |
| Polyolefin C | 28.1 | 0.48 | 0.48 | | 131.5 | 2000 | 200 | 9.29 |
| Polyolefin D | 27.7 | 0.24 | 0.24 | | 128.2 | 2000 | 225 | 11.49 |
| Polyolefin E | 28.1 | 0.12 | 0.12 | | 132.5 | 2000 | 238 | 13.48 |
| Polyolefin F | 28.13 | 0.48 | | 0.72 | 131.1 | 2000 | 205 | 10.85 |

Ethylene monomer is present in an amount such that Ethylene + VA + MEIO + MAM + AE2H + initiator is 100 wt %.

The obtained polymers are analysed by proton Nuclear Magnetic Resonance (in a 50% solution in D2-chloroform, using an Avance 400 instrument) and corresponding melt index (190° C., 2.16 kg), measured as described in ASTM D1238, are shown in Table 2.

TABLE 2

| | VA (wt % by $^1$H NMR) | MAM (wt % by $^1$H NMR) | MEIO (wt % by $^1$H NMR) | AE2H (wt % by $^1$H NMR) | Melt Index 190° C. - 2.16 kg (g/10 min) |
|---|---|---|---|---|---|
| Polyolefin A | 26.9 | / | | | 406 |
| Polyolefin B | 26.7 | 3.8 | | | 350 |
| Polyolefin C | 26.1 | 4.7 | 4 | | 230 |
| Polyolefin D | 26.2 | 1.8 | 1.3 | | 261 |
| Polyolefin E | 27.1 | 0.8 | 0.5 | | 387 |
| Polyolefin F | 25.6 | | 4 | 4.6 | 265 |

Example 2

Bituminous Composition Preparation

Bituminous Compositions 1, 2 and 3 were prepared by adding 5 parts of Polyolefin A, Polyolefin B and Polyolefin D respectively in solid form into 100 parts of a TOTAL bitumen with a penetration of 50/70. The bitumen was previously heated to 160° C. and kept at that temperature under mild stirring conditions (about 100 RPM) during the addition of the polymer. After the addition of the polymer was complete, the mixture was stirred for 15 minutes to obtained a homogenous mixture.

Example 3

MSCR Test on Bituminous Compositions

Multiple stress creep and recovery (MSCR) measurements were carried out on the compositions prepared in example 2 as described in ASTM D 7405-08. The obtained results are shown in Table 3. The measurements obtained with the pure bitumen 50/70 are also shown for reference. It can be observed that Composition 1, containing the EVA polymer without MAM and MEIO (Polyolefin A) already shows an increase in elastic recovery and reduction of the compliance compared to the pure bitumen. An increase in elastic recovery and a reduction in compliance (less deformation) at both stress conditions of the test, 100 Pa and 3200 Pa, are the desired results of polymer bitumen modification. Composition 2, which comprises a polymer with MAM but without MEIO (Polyolefin B) does have a small decrease in the elastic recovery and increase in compliance compared to composition 1. Surprisingly, composition 3, which comprises a polymer containing MEIO (Polyolefin D), shows a significant increase in elastic recovery and reduction in compliance compared to both Compositions 1 and 2. A clear improvement in the performance properties of bitumen is observed by the presence of the associative groups in the polymer used for modification, as described in this invention.

TABLE 3

| | Elastic recovery at 100 Pa (%) | Elastic recovery at 3200 Pa (%) | Compliance at 100 Pa (Pa$^{-1}$) | Compliance at 3200 Pa (Pa$^{-1}$) |
|---|---|---|---|---|
| Pure bitumen | 4.8 | 0 | 0.093 | 0.101 |
| Composition 1 | 16.9 | 3.6 | 0.070 | 0.094 |
| Composition 2 | 15.5 | 2.0 | 0.075 | 0.101 |
| Composition 3 | 21.9 | 8.8 | 0.057 | 0.070 |

The invention claimed is:

1. A bituminous composition comprising at least one bitumen and at least one polyolefin comprising one or more associative group(s), wherein said at least one polyolefin is the polymerisation product of ethylene, at least one associative group-containing olefinic monomer, and one or more other olefinic monomer(s) selected from the group consisting of unsaturated carboxylic acids; unsaturated carboxylic acid esters; carboxylic acid vinyl esters; olefins; dienes; unsaturated carboxylic acid anhydrides; and unsaturated epoxides, and wherein the associative group(s) comprise at least one 5- or 6-membered heterocyclic ring containing at least one nitrogen atom.

2. The bituminous composition of claim 1, wherein the at least one associative group-containing olefinic monomer corresponds to formula (1):

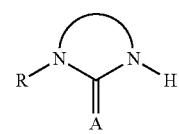

(1)

wherein:
R represents a group of formula T-(G)$_n$-, T being a reactive polymerizable group with at least one ethylenic function;
n is 0 or 1;
G is a C$_1$-C$_{24}$ linear or branched alkylene chain, optionally comprising one or more nitrogen atom(s); and
A represents oxygen or sulphur.

3. The bituminous composition of claim 1, wherein said polyolefin is the polymerisation product of the following monomers:
ethylene;
olefinic monomer(s) comprising at least one associative group; and
at least one other monomer selected from the group consisting of styrene, vinyl acetate, methyl (meth)acrylate, ethyl (meth)acrylate, n-butyl and 2-ethylhexyl (meth) acrylate.

4. The bituminous composition of claim 1, wherein said polyolefin is the polymerisation product of the following monomers, the amount of which, relative to the total mass of the polyolefin, being:
from 5 wt % to 99.98 wt % of ethylene;
from 0.01 wt % to 20 wt % of at least one associative group-containing olefinic monomer; and
from 0.01 wt % to 50 wt % of at least one other monomer.

5. The bituminous composition of claim 1, wherein said polyolefin has a melt index (as measured by the ASTM D1238, at 190° C., 2.16 kq) of between 1 g/10 min and 1000 g/10 min.

6. The bituminous composition of claim 1, wherein the content of the at least one polyolefin is in the range of 0.05 parts by weight to 20 parts by weight for 100 parts of bitumen(s).

7. The bituminous composition of claim 1, which is in the form of a dispersion, a solution, or in the form of an aqueous emulsion, wherein the amount of water ranges from 5 vol % to 90 vol % of the total volume of the emulsion.

8. A process for the preparation of a bituminous composition in accordance with claim 1, comprising at least the steps of:
adding 0.05 to 20 parts by weight of at least one polyolefin comprising one or more associative group(s) either in a solid, molten, dissolved or dispersed state to 100 parts by weight of a bitumen at its standard temperature for bitumen storage, depending on its class, as described in NF EN 13108-1 of February 2007,
optionally adding, before or after the addition of the said polyolefin, one or more additives,
mixing, by any mechanical means, for a period of time, and obtaining a bituminous composition ready to use.

9. A formulation comprising a) at least one polyolefin comprising one or more associative group(s), wherein said at least one polyolefin is the polymerisation product of ethylene, at least one associative group-containing olefinic monomer, and one or more other olefinic monomer(s) selected from the group consisting of unsaturated carboxylic acids; unsaturated carboxylic acid esters; carboxylic acid vinyl esters; olefins; dienes; unsaturated carboxylic acid anhydrides; and unsaturated epoxides, and wherein the associative group(s) comprise at least one 5- or 6-membered heterocyclic ring containing at least one nitrogen atom, and b) one or more additives selected from the group consisting of anti-stripping agents, organic and inorganic acids, paraffins, esters of fatty acids and functionalised waxes, dialkyldiamides, resin components, styrene butadiene rubbers, styrene/butadiene block copolymers, ethylene-vinyl acetate copolymers, ethylene-acrylate copolymers, polyolefins, crumb rubbers, fluxants, asphaltites, oils from vegetal or mineral sources and their derivatives, as well as those additives used to reduce the production temperature of an asphalt mixture.

10. An asphalt mixture comprising a bituminous composition in accordance with claim 1 and mineral aggregates.

11. A rolling surface coated in whole or in part with a bituminous composition in accordance with claim 1.

12. The bituminous composition of claim 1, wherein the associative group comprises at least one 5- or 6-membered heterocyclic ring containing at least two nitrogen atoms together with at least one carbonyl or thiocarbonyl function.

13. The bituminous composition of claim 1, wherein the associative group is derived from ethylimidazolidone methacrylate or ethylimidazolidone methacrylamide.

14. The bituminous composition of claim 1, wherein said polyolefin is the polymerisation product of the following monomers, the amount of which, relative to the total mass of the polyolefin, being:
from 55 wt % to 89.9 wt % of ethylene;
from 0.1 wt % to 10 wt % of at least one associative group-containing olefinic monomer; and
from 10 wt % to 40 wt % of at least one other monomer selected from the group consisting of unsaturated carboxylic acids, carboxylic acid vinyl esters, styrene, and mixtures thereof.

15. The bituminous composition of claim 14, wherein the associative group-containing olefinic monomer has formula (1):

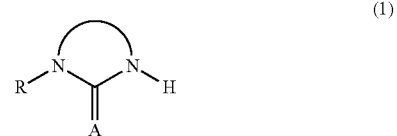

wherein:
R represents a group of formula T-(G)$_n$-, T being a reactive polymerizable group with at least one ethylenic function;
n is 0 or 1;
G is a $C_1$-$C_6$ linear alkylene chain, optionally comprising one or more nitrogen atom(s); and
A represents oxygen or sulphur.

16. The bituminous composition of claim 14, wherein the associative group-containing olefinic monomer is ethylimidazolidone methacrylate or ethylimidazolidone methacrylamide.

17. The bituminous composition of claim 1, wherein the polyolefin is the polymerisation product of ethylene, vinyl acetate, imidazolidone methyl methacrylate, methyl methacrylate, and 2-ethyl hexyl methacrylate.

18. The bituminous composition of claim 1, wherein the bituminous composition does not contain any polyamide polymer.

* * * * *